May 15, 1923.
H. P. GERDIL
DRILL
Filed June 23, 1920
1,454,851
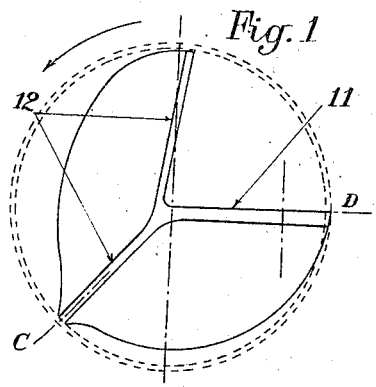
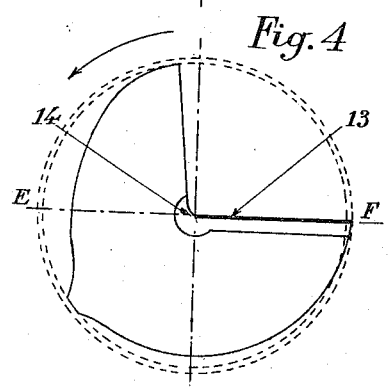
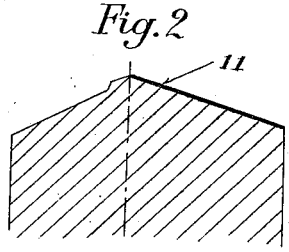
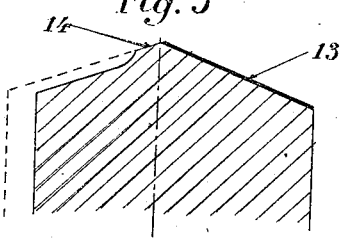
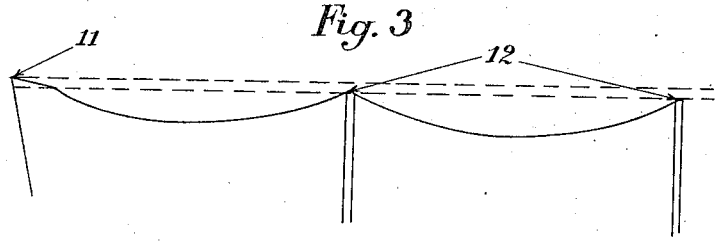
INVENTOR:
Henri Prosper Gerdil.
By
ATTORNEY.

Patented May 15, 1923.

1,454,851

UNITED STATES PATENT OFFICE.

HENRI PROSPER GERDIL, OF PARIS, FRANCE.

DRILL.

Application filed June 23, 1920. Serial No. 391,022.

*To all whom it may concern:*

Be it known that I, HENRI PROSPER GERDIL, citizen of the Republic of France, residing at 51 Avenue de Suffren, Paris, in the Republic of France, have invented new and useful Improvements in Drills, of which the following is a specification.

This invention relates to improvements in cutting or non-cutting tools used for working any materials.

In his patent application No. 317,139, applicant has described a rotary cutting tool characterized in that it is provided with bearing surfaces of a reduced area which are preferably in the form of thin ribs and by means of which the tool may rest during the operation upon the wall of the cut formed in the work.

Applicant has also described in the above application an improvement in rotary cutting tools which consists in that the "pitch" or angular distance between two succeeding cutting edges is greater than or equal to the arc along which each cutting edge can engage with the work, whereby the tool never has two or more cutting edges in engagement with the work at the same time.

This invention consists in extending said improvements to that kind of tools which are working axially such as drills.

In the annexed drawings, given by way of example;

Fig. 1 is an end view of a drill provided with radial ribs;

Fig. 2 is a section thereof along the line C—D (Fig. 1);

Fig. 3 is a development of the end working face of the drill;

Fig. 4 is an end view of a drill provided with another type of ribs;

Fig. 5 is a section thereof along the line E F (Fig. 4).

In the case of tools working axially, i. e., with a feed along the axis of rotation, such as drills, etc., the working end of the tool can be ribbed in various ways. The drill which is represented in Figs. 1, 2 and 3 is provided with a bevelled cutting edge 11. The arc along which the tool is in engagement with the work being 360°, one cutting edge only is provided. Two ribs 12 of the radial type are provided, said ribs forming the continuation of the lateral ribs provided on the side surface of the tool and extending up to the central point of the drill. The top faces of said end ribs are uniformly distributed on the conical surface containing the cutting edge. To form said ribs, the end of the tool has been hollowed in suitable places.

The drill which is represented in Figs. 4 and 5 is provided with a bevelled cutting edge shown at 13. The rib, which is of the concentric type, is merely formed by a small central cap or projection 14 having a few millimeters in diameter. The cutting edge, the cap 14 and the end surface of the tool have the same conicity. The cap 14 projects above the end surface of the tool by the same distance as the cutting edge. The central cap forms a pivot which acts to hold the tool.

Finally, the invention consists also in applying the improvements described in the prior application above referred to, as well at those explained above whatever be the way in which the relative movement between the tool and the work is obtained, viz. in any one of the three following cases:

1. The work is stationary and the tool is movable,

2. The work is movable and the tool is stationary,

3. The work and the tool are moved simultaneously.

Having now described my invention, what I claim as new and desire to secure by Letters Patent is:

1. A drill comprising a main body, a single radial cutting edge on the end working face of said body, thin longitudinal ribs guiding the drill in the hole formed in the work and thin radial ribs on said end working face in the plane of said longitudinal ribs and adapted to rest in operation upon the bottom wall of the hole formed in the work.

2. A drill comprising a main body, a single radial cutting edge projecting above the end working face of said body, thin longitudinal ribs guiding the drill in the hole formed in the work and a small central cap on said end working face projecting above the latter by the same distance as the cutting edge and adapted to rest in operation upon the bottom wall of the hole formed in the work.

In testimony whereof I have signed my name to this specification.

HENRI PROSPER GERDIL.